United States Patent
Ahuja et al.

(10) Patent No.: US 10,183,639 B2
(45) Date of Patent: Jan. 22, 2019

(54) BUMPER FOR A MOTOR VEHICLE

(71) Applicant: Benteler Automobiltechnik GmbH, Paderborn (DE)

(72) Inventors: Gaurav Ahuja, Grandville, MI (US); Sivanathan Prasoody, Holland, MI (US)

(73) Assignee: Benteler Automobiltechnik GmbH, Paderborn (DE)

( * ) Notice: Subject to any disclaimer, the term of this patent is extended or adjusted under 35 U.S.C. 154(b) by 69 days.

(21) Appl. No.: 15/333,955

(22) Filed: Oct. 25, 2016

(65) Prior Publication Data

US 2017/0113638 A1    Apr. 27, 2017

Related U.S. Application Data

(60) Provisional application No. 62/246,291, filed on Oct. 26, 2015.

(51) Int. Cl.
*B60R 19/34* (2006.01)
*B60R 19/02* (2006.01)
*B60R 19/03* (2006.01)
*B60R 19/48* (2006.01)

(52) U.S. Cl.
CPC ............ *B60R 19/34* (2013.01); *B60R 19/023* (2013.01); *B60R 19/03* (2013.01); *B60R 19/48* (2013.01)

(58) Field of Classification Search
CPC ....... B60R 19/34; B60R 19/03; B60R 19/023; B60R 19/48
See application file for complete search history.

(56) References Cited

U.S. PATENT DOCUMENTS 9,855,906 B2 *  1/2018  Garnweidner .......... B60R 19/48

FOREIGN PATENT DOCUMENTS

| DE | 69014045 T2 | 3/1991 |
| DE | 19545069 A1 | 4/1997 |
| DE | 10 2008 057 379 A1 | 5/2010 |
| DE | 102008057379 A1 | 5/2010 |
| DE | 102012018708 A1 | 3/2013 |

OTHER PUBLICATIONS

German Search Report dated Sep. 9, 2016 with respect to counterpart German patent application 10 2015 121 152.1.
Translation of German Search Report dated Sep. 9, 2016 with respect to counterpart German patent application 10 2015 121 152.1.

* cited by examiner

*Primary Examiner* — D Glenn Dayoan
*Assistant Examiner* — Melissa A Black
(74) *Attorney, Agent, or Firm* — Henry M. Feiereisen LLC

(57) ABSTRACT

A bumper for a motor vehicle includes a cross member which is made of light metal alloy and configured as hollow profile to define an interior space and which has a top beam and a bottom beam, with the top beam and/or bottom beam having a recess defined by a marginal area in the form of a collar oriented into an interior space of the cross member. Arranged at an end of the cross member is a crash box formed with a flange sized to overlap at least one region of the cross member in motor vehicle longitudinal direction. A spacer is arranged in the interior space of the cross member and has a chamfer for formfitting engagement by the collar. A fastener is configured for passage of the recess and thereby extending in a motor vehicle vertical direction through the flange of each crash box and the spacer.

20 Claims, 6 Drawing Sheets

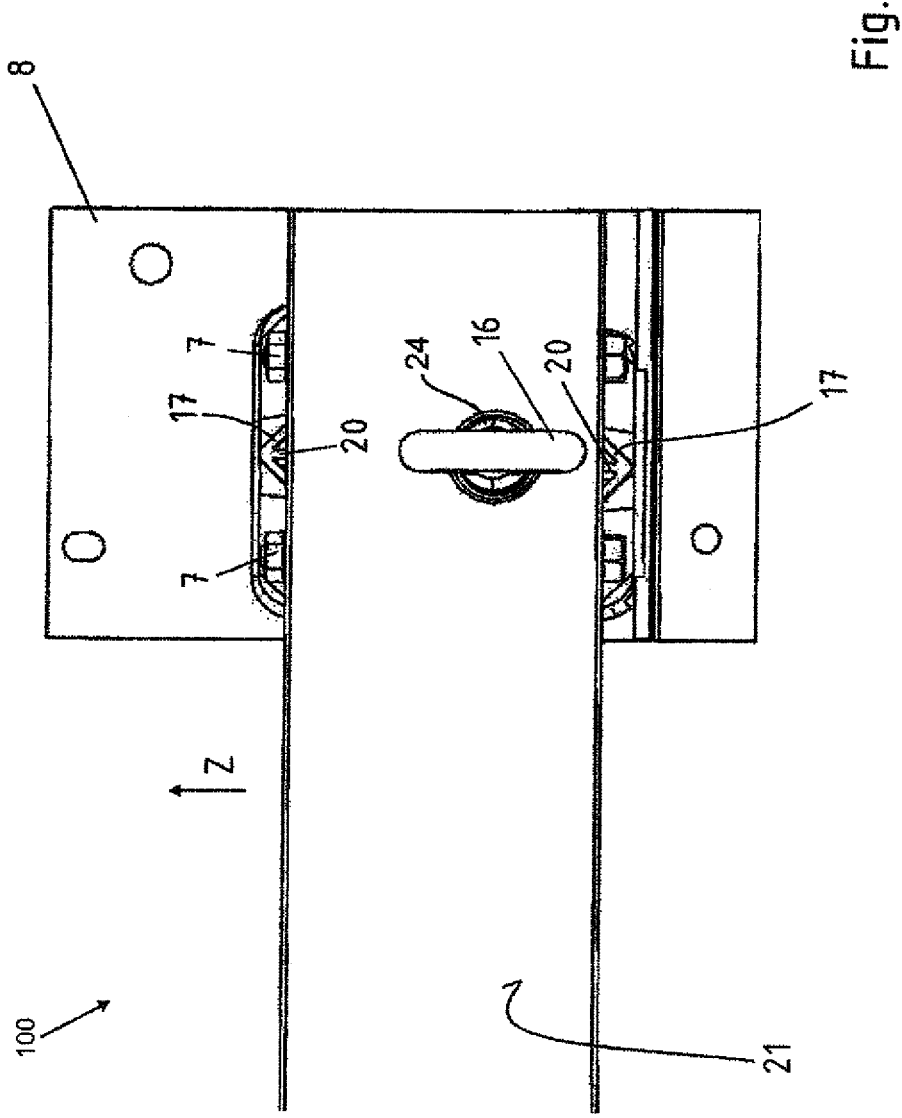

BUMPER FOR A MOTOR VEHICLE

CROSS-REFERENCES TO RELATED APPLICATIONS

This application claims the benefit of prior filed U.S. Provisional Application No. 62/246,291, filed Oct. 26, 2015, pursuant to 35 U.S.C. 119(e). The content of U.S. Provisional Application No. 62/246,291 is incorporated herein by reference in its entirety as if fully set forth herein.

BACKGROUND OF THE INVENTION

The present invention relates to a bumper for a motor vehicle.

The following discussion of related art is provided to assist the reader in understanding the advantages of the invention, and is not to be construed as an admission that this related art is prior art to this invention.

It is known in the art to equip motor vehicle with bumpers at the front and end. The bumpers typically include a cross member which substantially extends across the entire motor vehicle width. The cross member itself is coupled to the body and/or longitudinal members via crash boxes. In the event of an impact, the crash boxes are deformed and dissipate hereby crash energy through deformation work.

Both the front and the rear of a motor vehicle should have the option to arrange a tow lug that is fixed in place. The cross member itself is oftentimes the component which is firmly connected to the motor vehicle structure and projects out from the motor vehicle the furthest beyond the motor vehicle body. The attachment of the tow lug on the cross member itself and/or to place the tow lug through an opening in the cross member has prevailed in the art. It is also known in the art, to couple the motor vehicle lug with a sleeve or receiving openings which is arranged in the region of a crash box.

It would be desirable and advantageous to provide an improved bumper which obviates prior art shortcomings and is easy and cost-effectively to mount, and which has a good crash performance and affords the possibility to easily and effectively arrange a tow lug thereon.

SUMMARY OF THE INVENTION

According to one aspect of the present invention, a bumper for a motor vehicle includes a cross member made of a light metal alloy and configured in the form of a hollow profile to define an interior space, the cross member having a top beam and a bottom beam, with the top beam and/or the bottom beam having a recess defined by a marginal area in the form of a collar oriented into the interior space of the cross member, a crash box arranged at an end of the cross member for coupling the bumper to the motor vehicle, the crash box having a topside and a bottom side, each of the top and bottom sides including a flange sized to overlap at least one region of the cross member in a motor vehicle longitudinal direction, a spacer arranged in the interior space of the cross member and having a chamfer for engagement by the collar in a formfitting manner, and a fastener configured for passage of the recess of the cross member and thereby extending in a motor vehicle vertical direction through the flanges of the crash box and the spacer.

A bumper according to the invention for a motor vehicle includes a cross member as well as crash boxes in the region of the ends of the cross member for coupling the bumper to the motor vehicle. Suitably, the crash boxes are coupled in prolongation of a longitudinal member on the motor vehicle body. The cross member can be formed from a light metal alloy as hollow profile, advantageously as extruded hollow profile. A crash box, respectively arranged in the end region of the cross member has a flange which projects out at the topside and bottom side, with the flange spanning, at least in part, the cross member in motor vehicle longitudinal direction. Provision is further made for a fastener, advantageously a screw connection, which in motor vehicle vertical direction extends through the flanges and the cross member. The screw connection secures the cross member upon the crash boxes.

According to another advantageous feature of the present invention, the fastener can be a screw bolt which extends through a recess in the top beam and/or bottom beam of the cross member. The marginal area of the recess is formed to establish a collar oriented into the interior space of the cross member and formfittingly engaging in the chamfer of the spacer. As a result, it is possible to position the spacer in the cross member and to fix it in place by the collar, so that subsequently, also in possibly required intermediate steps, the crash boxes can be arranged on the cross member and the fastener can be guided through the flange and the cross member as well as the spacer arranged therein. Thus, cross member and crash boxes are especially easy to install. In addition, the bumper is further stiffened by the presence of the spacer. As the spacer is not only traversed by the screw bolt, but also in addition formfittingly fixed in place by the collar, both the integrity and durability of the bumper are improved, resulting in a better crash performance while affording the possibility to attach a tow lug at the same time.

According to another advantageous feature of the present invention, the spacer can be provided with an internal thread which is oriented in the motor vehicle longitudinal direction for threadably engaging a tow lug. Thus, there is no need to provide the crash box and/or the cross member with an additional installation of a threaded lug. The cross member can have an opening, for example a hole, with the tow lug being arranged within the cross member so that the tow lug can be screwed into the spacer very easily while extending through a front wall of the cross member. The spacer, which is formfittingly coupled in particular by the collar, has improved load guidance in the event of towing and thus a load absorption in motor vehicle longitudinal direction and indirectly a force introduction into the top beam and the bottom beam of the cross member.

When overseas transport is involved, a tow lug is used to tie down the motor vehicle to a transportation device, for example a ship. The tow lug is hereby subjected to a load, not in motor vehicle longitudinal direction but at an angle, especially more than 45°. Thus, the tow lug is tied down slantingly downwards. Also in this case, the spacer as receptacle of the tow lug affords a better possibility of force introduction in view of the presence of the collar.

According to another advantageous feature of the present invention, the cross member can be configured as multi-chamber profile defining chambers which are arranged above one another in the motor vehicle vertical direction. Advantageously, a plurality of spacers can be provided for arrangement in each of the chambers. The collar can then be formed in particular only on an upper beam and a bottom beam. A middle web has no collar.

According to another advantageous feature of the present invention, the spacer can be made of an aluminum alloy produced by extrusion. The spacer may hereby be oriented with its extrusion direction in the interior space in the motor vehicle vertical direction. This affords during longitudinal extrusion especially the possibility to also extrude a recess, which extends correspondingly through the spacer, for passage of the screw bolt. In the case of an internal thread for receiving a tow lug, the latter is then oriented to extend through the spacer transversely to the extrusion direction, at least in part. As an alternative, it may also be possible to orient the spacer with its extrusion direction in the hollow chamber in motor vehicle longitudinal direction. It is then possible to also extrude a respective opening and/or threaded bore for receiving the tow lug in the extrusion direction. A respective opening for traversal of the spacer by the screw bolt can then again be introduced transversely to the extrusion direction, for example by drilling or a material-removing process. The installation holder is incidentally solidly configured.

The chamfer of the spacer may advantageously be introduced after extrusion by way of a material-removing process. The collar can be formed by a punching process or compression process. The hole of the recess can then also be introduced or formed by a piercing process beforehand.

According to another advantageous feature of the present invention, the collar can be oriented in the hollow chamber to extend especially at an angle between 5 and 60°, preferably between 6 and 50°, in particular from 10 to 45° in relation to the top beam or the bottom beam. Currently preferred is an angle of about 45°.

In the assembled state, the collar of the bumper rests formfittingly at least in part upon an inner surface area of the chamfer. This enables better stiffening because the opening of the spacer for passage of the fastener, e.g. screw bolt, is formed normally as clearance fit, so that the fastener can easily be inserted even in the presence of production tolerances. As a result of the formfitting contact between outer surface area of the fastener, collar, and inner surface area of the chamfer, additional stiffening is established.

According to another advantageous feature of the present invention, the chamfer may have, in the event of a preceding formation through a material-removing process, an angle between 5 and 60°, preferably between 10 and 50°, in particular from 40 to 50°. Currently preferred is an angle of 45°. Provision is made in particular within the scope of the invention that the stamping in of the collar causes the angle of the chamfer to again slightly alter, in particular increase, as the collar is stamped in. This ensures a reliable formfitting contact between collar and chamfer.

According to another advantageous feature of the present invention, the chamfer can be defined in motor vehicle vertical direction by a height which is equal or greater than a wall thickness of the top beam and/or bottom beam.

According to another advantageous feature of the present invention, the flange of the crash box can be made, at least in part, of two layers. The double layer is produced especially when the crash box is formed as extruded profile and formed as hollow profile on its topside and/or bottom side and thus as multi-chamber hollow profile in overall cross section, advantageously at least as three-chamber hollow profile. At least an upper and/or lower chamber is then flattened to form the flange, so that the two layers of the chamber are pressed flatly upon one another.

According to another advantageous feature of the present invention, the crash box can be configured on a top side and/or bottom side to have at least two adjacent chambers separated by a web which is oriented in the motor vehicle longitudinal direction, with the adjacent chambers having at least one region which is flattened to form the flange so that the web has a cross section in the form of a triangle extending in the motor vehicle longitudinal direction. This hollow chamber profile with a triangular configuration in cross section extends then again in longitudinal direction and affords already the possibility to convert crash energy into deformation work in the event of a motor vehicle crash.

According to another advantageous feature of the present invention, the cross member can have a front wall, with at least one side flange being arranged in the motor vehicle vertical direction on the front wall and sized to extend out. Advantageously, the flange of the crash box can be oriented in motor vehicle longitudinal direction to extend up to a backside of the side flange. In the presence of the aforedescribed triangular configuration, and also when the flange is in substantial formfitting contact, better stiffening is established and deformation work takes place in the event of a crash, so that the crash energy can again be better dissipated as a result of deformation work.

The fact that the crash box can be formed in the region of the flange with a triangular structure in cross section, at least in the region of the web, may also be interpreted as independent inventive idea. This may be realized especially also in the absence of the spacer or tow lug, and thus only on the flange of the crash box in combination with the cross member.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 6 is a front view of the bumper of FIG. 4.

DETAILED DESCRIPTION OF PREFERRED EMBODIMENTS

Figure 1:
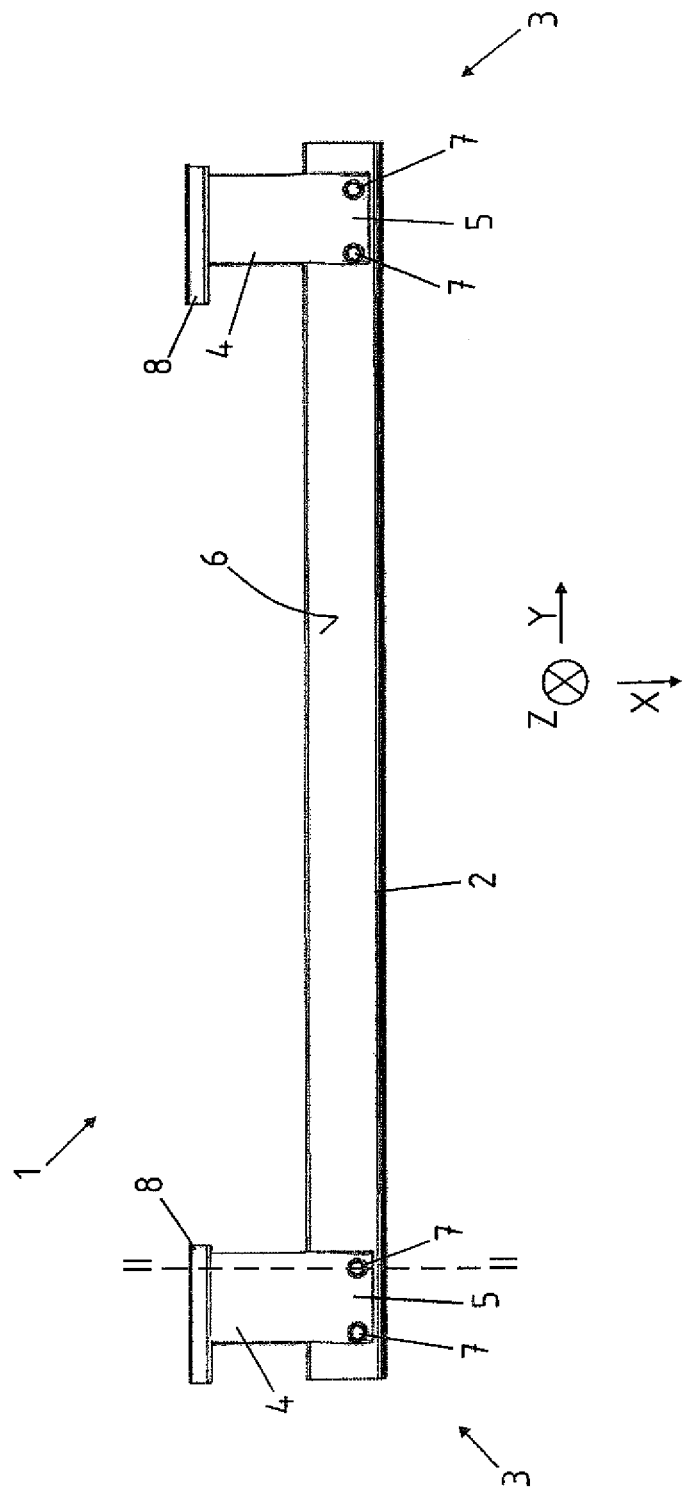
FIG. 1 is a top view of one embodiment of a bumper according to the invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a top view of one embodiment of a bumper according to the invention, generally designated by reference numeral 1. The bumper 1 includes a cross member 2, extending in motor vehicle transverse direction Y, with crash boxes 4 respectively arranged in the region of the ends 3 of the cross member 2. The crash boxes 4 have, as shown here, at their topside a flange 5, which spans the cross member 2 in motor vehicle longitudinal direction X at least in part. A flange 5 may also be formed on a not-shown bottom side of the crash box 4. The flange 5 rests in particular upon a top beam 6 of the cross member 2 and provision is made for screw connections with screw bolts 7 to couple the cross member 2 in motor vehicle vertical direction Z with the crash boxes 4 by extending there through. The crash boxes 4 in turn have a rear coupling plate 8 so as to be mounted to longitudinal members, not shown in greater detail.

Figure 2:
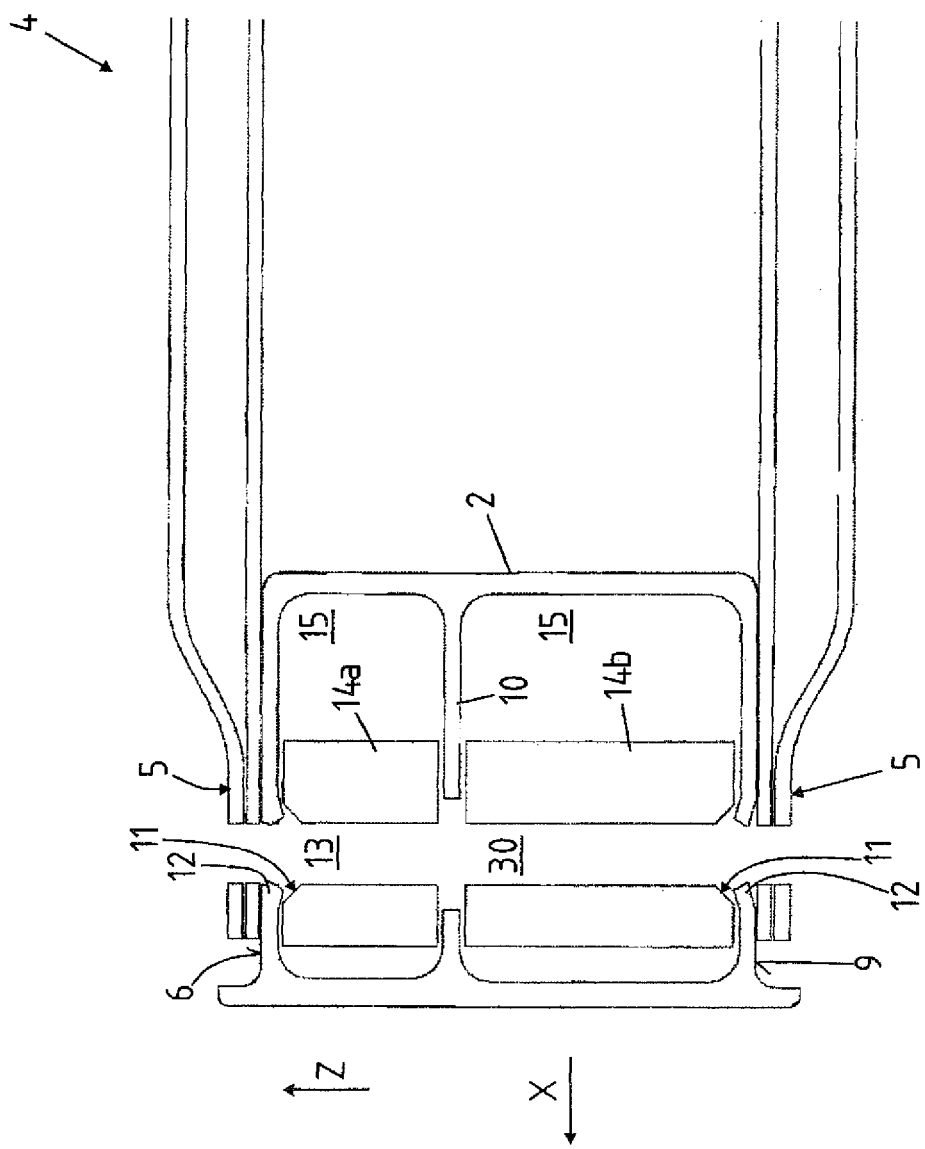
FIG. 2 is a longitudinal section of the bumper, taken along the section line II-II in FIG. 1.

FIG. 2 shows a longitudinal sectional view through a crash box 4, taken along the section line II-II in FIG. 1, without illustration of screw bolts 7. As can be seen, the crash box 4 spans the cross member 2 on the top and bottom sides in motor vehicle longitudinal direction X. Each flange 5 of the crash box 4 is made of two layers. Not only the top beam 6 but also the bottom beam 9 of the cross member 2 are each spanned by a flange 5, at least in part. The cross member 2 in turn is formed as a two-chamber hollow profile and has a middle web 10 to separate the two hollow chambers 15. A spacer 14 is arranged in each hollow chamber 15, with the upper spacer 14a having a chamfer 11 in the region of the top beam 6, and the lower spacer 14b having a chamfer 11 in the region of the bottom beam 9. Provision is now made in accordance with the invention to form a collar 12 on both the top beam 6 and the bottom beam 9. The collar 12 circumferentially embraces a recess 13 for passage of a fastener, e.g. screw bolt 7, not shown in FIG. 2.

Figure 3:
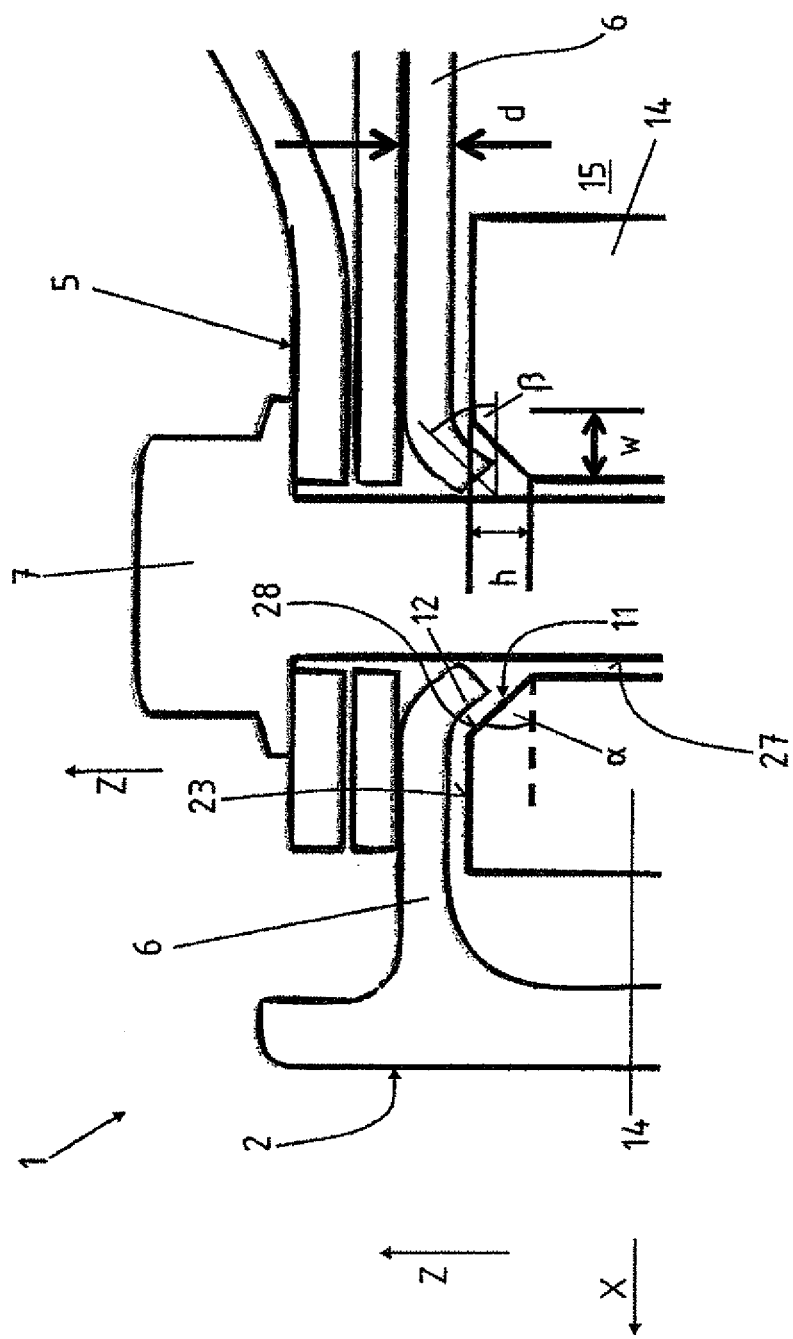
FIG. 3 a detailed cutaway view of the bumper, on an enlarged scale, by way of a longitudinal section.

FIG. 3 illustrates again the bumper 1 according to the invention by way of an enlarged cutaway view. The top beam 6 of the cross member 2 and the double-layered flange 5 lying on it are shown here. The flange 5 is traversed by the screw bolt 7 for formation of the screw connection. The spacer 14 is hereby arranged in the interior space 30 or in the hollow chamber 15. A depicted gap between top beam 6 and topside 23 of the spacer 14 may be formed, although it is preferred that the spacer 14 rests formfittingly upon the top beam 6 as a result of the force applied by the screw connection in motor vehicle vertical direction Z. It is readily apparent that the collar 12 is formed to be oriented into the hollow chamber 15 of the cross member 2. The collar 12 extends hereby at an angle $\beta$ of, for example, 45°, into the hollow chamber 15 in relation to the top beam 6. The chamfer 11 formed on the spacer 14 has an angle $\alpha$ by which the chamfer 11 extends in relation to the top beam 6 or to the plane defined by the motor vehicle longitudinal direction X and motor vehicle transverse direction Y. Currently preferred is an angle $\alpha$ of 45°. It is readily apparent that the collar 12 comes into formfitting contact on the outer surface area 27 of the screw bolt 7 and on the inner surface area 28 of the chamfer 11.

The chamfer 11 is defined by a height h in relation to the motor vehicle vertical direction Z. The height h is greater or equal to a wall thickness d of the top beam 6. Likewise, in connection with the bottom beam 9, the chamfer 11 of the spacer 14 has a height which is greater or equal to a wall thickness of the bottom beam 9. Further illustrated is a width w by which the chamfer 11, pointing in direction toward the spacer 14, is oriented in motor vehicle longitudinal direction X or motor vehicle transverse direction Y. Advantageously, the width corresponds to the height h, when the chamfer 11 is 45°.

Figure 4:
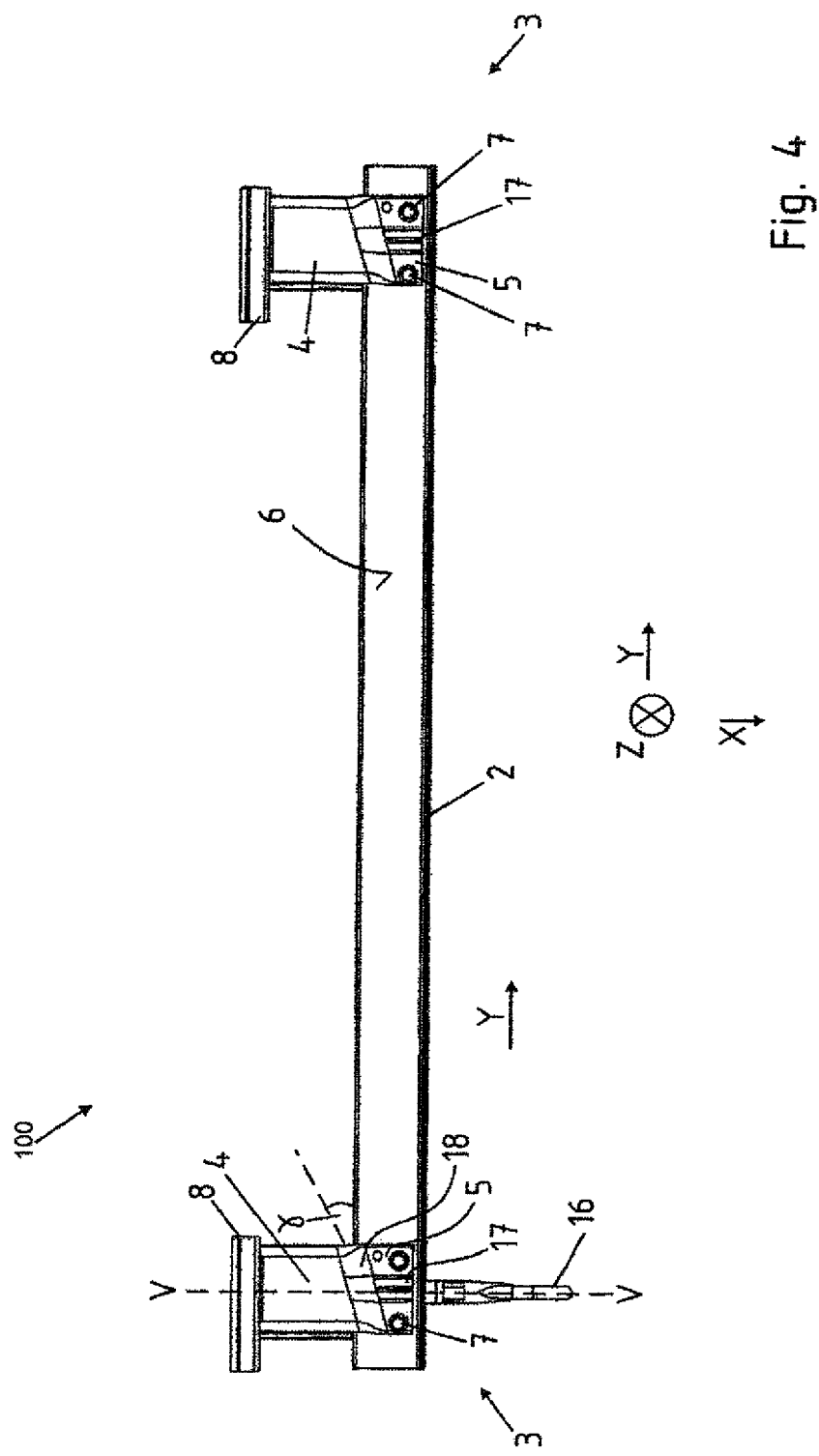
FIG. 4 is a top view of another embodiment of a bumper according to the invention with inserted tow lug.

FIG. 4 is a top view of another embodiment of a bumper according to the invention, generally designated by reference numeral 100. Parts corresponding with those in FIG. 1 are denoted by identical reference numerals and not explained again. The description below will center on the differences between the embodiments. In this embodiment, a tow lug 16 is inserted. Further illustrated are flanges 5 in modified configuration. Each flange 5 is formed here as a triangle 17 in cross section. A transition zone 18 for formation of a flattening of the flange 5 extends in particular at an angle $\gamma$ in relation to the motor vehicle transverse direction Y.

Figure 5:
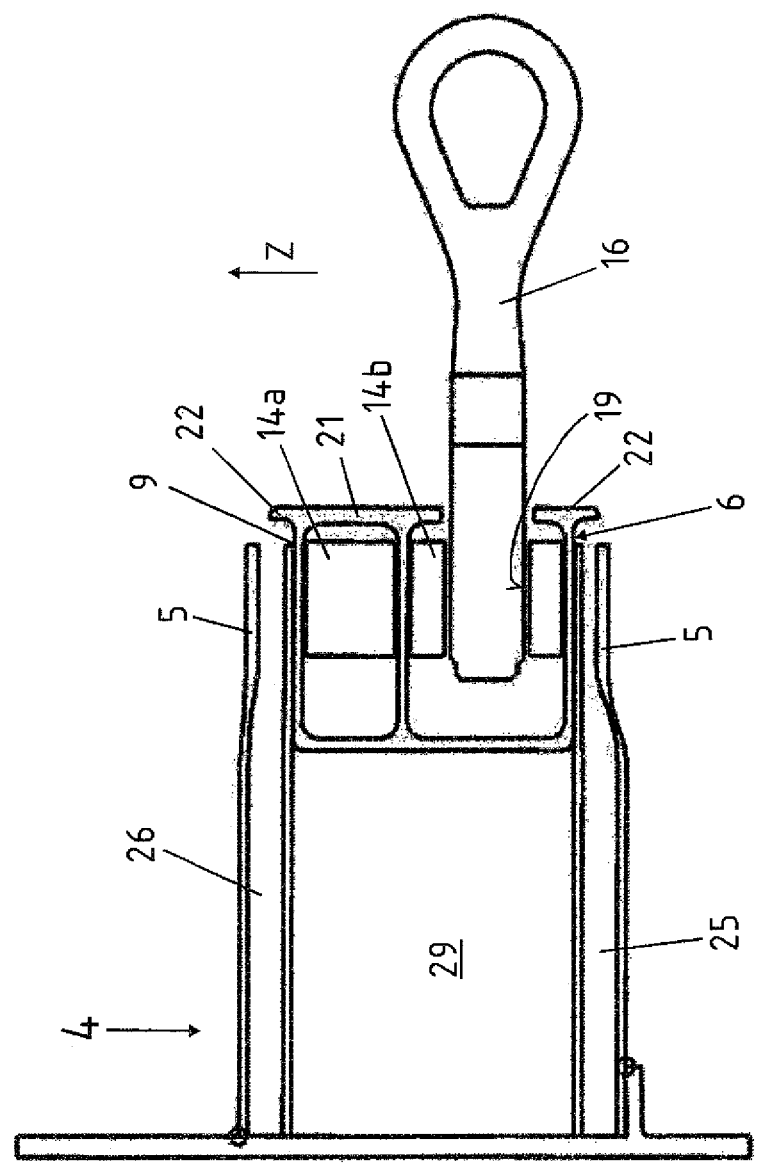
FIG. 5 is a longitudinal sectional view of the crash box of the bumper of FIG. 4, taken along the section line V-V in FIG. 4.

FIG. 5 shows a longitudinal sectional view through a crash box 4, taken along the section line V-V in FIG. 4. As is readily apparent, a lower spacer 14b, as relating to the drawing plane, is provided with an internal thread 19 for threaded engagement of the tow lug 16, also designated tow hook. An upper spacer 14a is hereby devoid of such an internal thread. Furthermore, it is readily apparent that the flanges 5 are not formed of two layers that formfittingly directly abut one another. The crash box 4 has a lower chamber 25 and an upper chamber 26 and a middle chamber 29 in-between. Both the lower chamber 25 and the upper chamber 26 are each flattened for formation of the flange 5. This may be realized also without middle web 20 so that no triangle structure is formed.

This is readily apparent from FIG. 6 which illustrates a front view of the bumper 100. The tow lug 16 is again readily apparent. Further flattened on the flanges 5 in cross section on the left side and right side are chambers, not shown in greater detail, of the flanges 5, with these chambers being separated from one another by a web 29 oriented in motor vehicle vertical direction Z, so as to form a triangular structure in cross section. The triangular structure extends in particular to a front wall 21 of the cross member 2. Further formed are side flanges 22 (FIG. 5) which extend out from the front wall 21 in motor vehicle vertical direction Z. The front wall 21 has further an opening 24 for passage of the tow lug 16.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A bumper for a motor vehicle, said bumper comprising:
 a cross member made of a light metal alloy and configured in the form of a hollow profile to define an interior space, said cross member having a top beam and a bottom beam, with at least one member selected from the group consisting of the top beam and the bottom beam having a recess defined by a marginal area in the form of a collar oriented into the interior space of the cross member;
 a crash box arranged at an end of the cross member for coupling the bumper to the motor vehicle, said crash box having a topside and a bottom side, each of the top and bottom sides including a flange sized to overlap at least one region of the cross member in a motor vehicle longitudinal direction;
 a spacer arranged in the interior space of the cross member and having a chamfer for engagement by the collar in a formfitting manner; and a fastener configured for passage of the recess of the cross member and thereby extending in a motor vehicle vertical direction through the flanges of the crash box and the spacer.

2. The bumper of claim 1, wherein the fastener is a screw bolt.

3. The bumper of claim 1, wherein the cross member is configured as multi-chamber profile defining chambers which are arranged above one another in the motor vehicle vertical direction, and further comprising a plurality of said spacer for arrangement in the chambers in one-to-one correspondence.

4. The bumper of claim 1, wherein the spacer is made of an aluminum alloy produced by extrusion.

5. The bumper of claim 4, wherein the spacer is oriented with its extrusion direction in the interior space in the motor vehicle vertical direction.

6. The bumper of claim 4, wherein the spacer is oriented with its extrusion direction in the interior space in the motor vehicle longitudinal direction.

7. The bumper of claim 1, wherein the spacer is provided with an internal thread which is oriented in the motor vehicle longitudinal direction for receiving a tow lug.

8. The bumper of claim 7, wherein the internal thread is formed in the spacer in one piece therewith and made of a same material as the spacer.

9. The bumper of claim 1, wherein the collar is oriented at an angle between 5 and 60° in relation to the member.

10. The bumper of claim 1, wherein the collar is oriented at an angle between 6 and 50° in relation to the member.

11. The bumper of claim 1, wherein the collar is oriented at an angle from 10 to 45° in relation to the member.

12. The bumper of claim 1, wherein the collar rests formfittingly, at least in part, upon an inner surface area of the chamfer.

13. The bumper of claim 1, wherein the chamfer is defined by an angle between 5 and 60°.

14. The bumper of claim 1, wherein the chamfer is defined by an angle between 10 and 50°, preferably from 40 to 50°, most preferred by an angle of 45°.

15. The bumper of claim 1, wherein the chamfer is defined in motor vehicle vertical direction by a height which is equal or greater than a wall thickness of the member.

16. The bumper of claim 1, wherein the flange of the crash box is made of two layers.

17. The bumper of claim 16, wherein the crash box has a top side and a bottom side, at least one of the top and bottom sides being configured in the form of a multi-chamber hollow profile, said flange being formed by flattening a chamber.

18. The bumper of claim 1, wherein the crash box is configured to have on a top side and/or bottom side at least two adjacent chambers separated by a web which is oriented in the motor vehicle vertical direction, said adjacent chambers having at least one region which is flattened to form the flange so that the web has a cross section in the form of a triangle extending in the motor vehicle longitudinal direction.

19. The bumper of claim 1, wherein the cross member has a front wall, with a side flange being arranged on the front wall in the motor vehicle vertical direction and sized to extend out.

20. The bumper of claim 19, wherein the flange is oriented in the motor vehicle vertical direction to extend to a backside of the side flange.

* * * * *